Dec. 23, 1941.   H. W. GARBE   2,267,273
COATING APPARATUS
Filed April 10, 1940   4 Sheets-Sheet 1
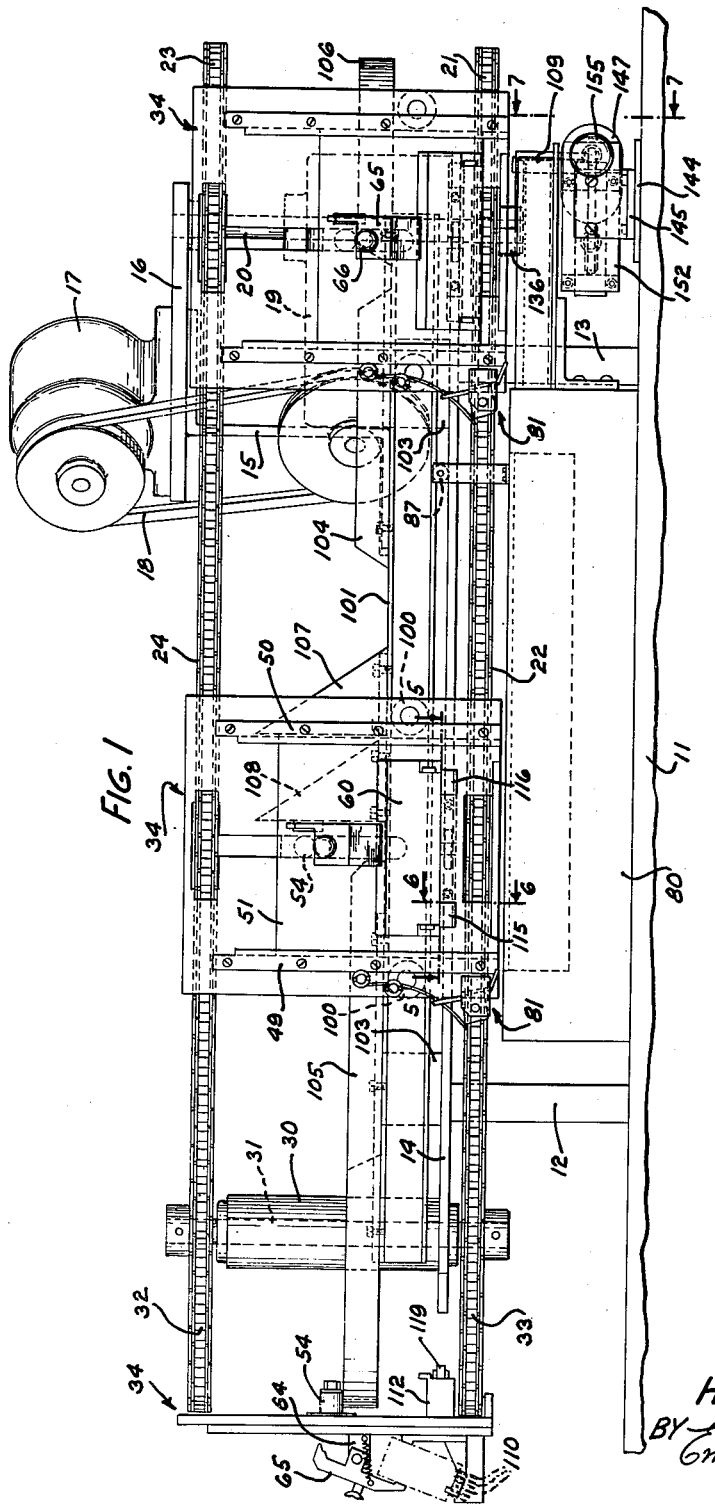
INVENTOR
*H.W.GARBE*
BY Emery Robinson
ATTORNEY

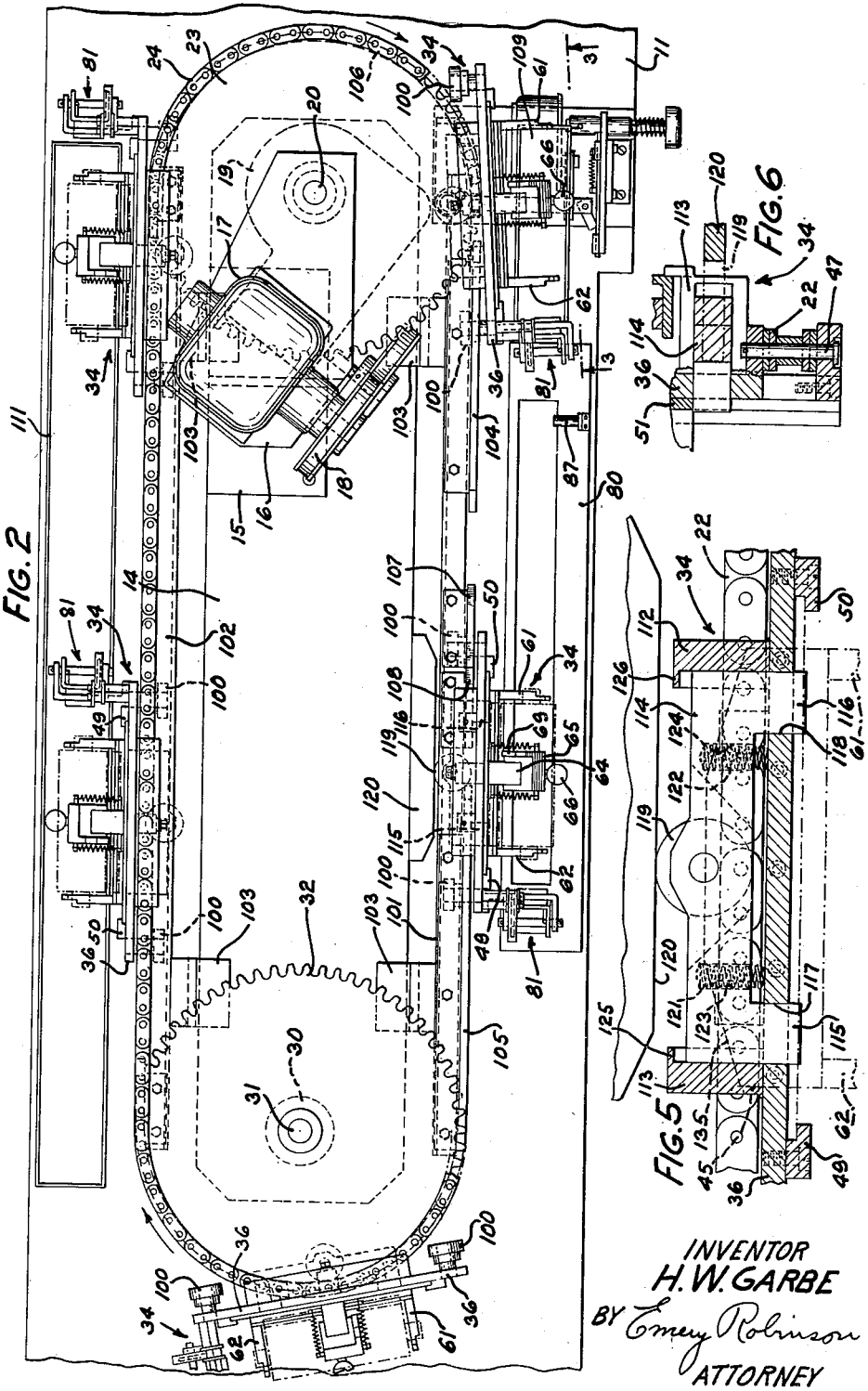

Dec. 23, 1941.  H. W. GARBE  2,267,273
COATING APPARATUS
Filed April 10, 1940  4 Sheets-Sheet 3
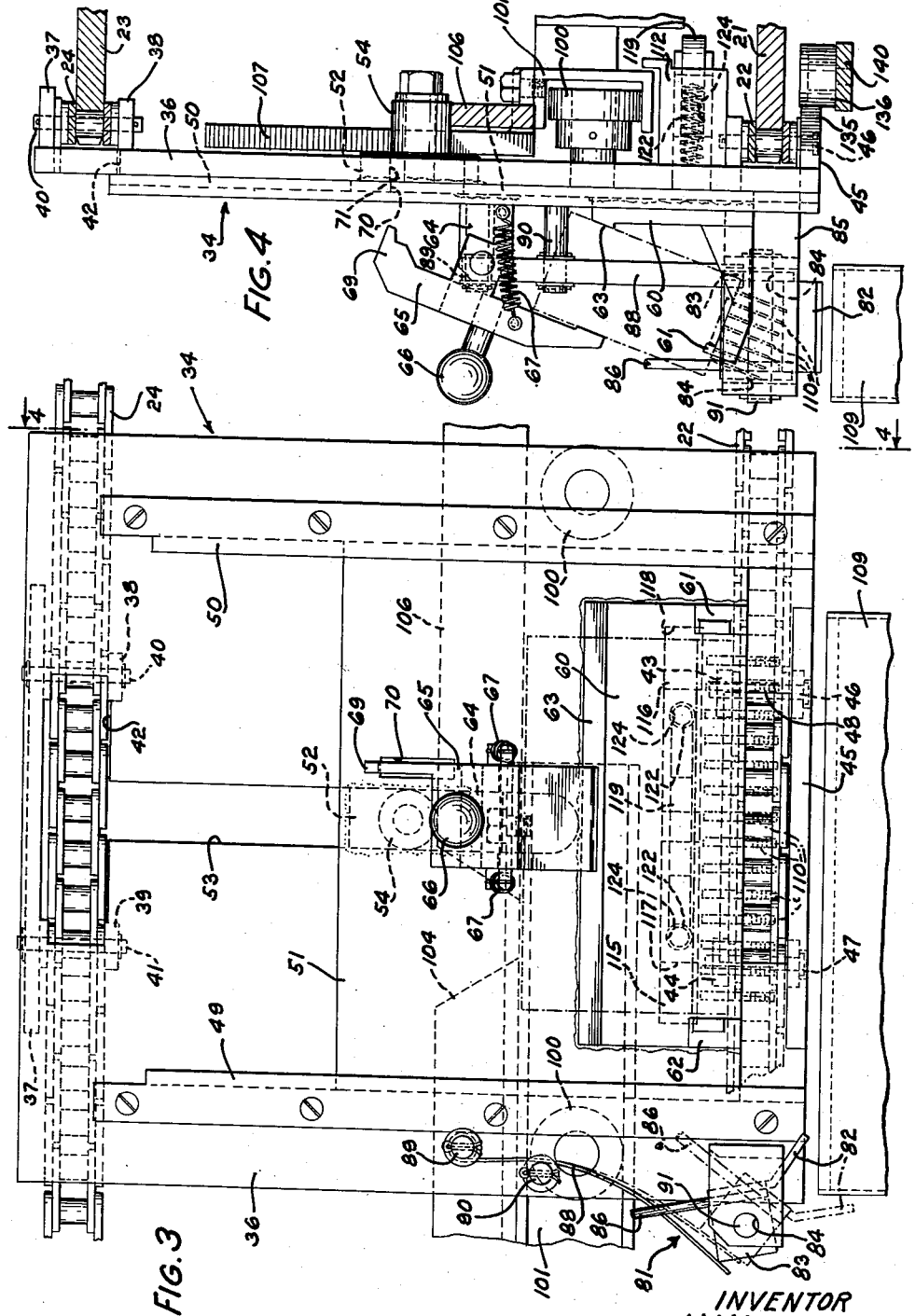
INVENTOR
H. W. GARBE
BY Emery Robinson
ATTORNEY Dec. 23, 1941.  H. W. GARBE  2,267,273
COATING APPARATUS
Filed April 10, 1940  4 Sheets—Sheet 4

INVENTOR
H. W. GARBE
BY Emery Robinson
ATTORNEY

Patented Dec. 23, 1941

2,267,273

UNITED STATES PATENT OFFICE 2,267,273

COATING APPARATUS

Howard W. Garbe, Hinsdale, Ill., assignor to Western Electric Company, Incorporated, New York, N. Y., a corporation of New York Application April 10, 1940, Serial No. 328,839

13 Claims. (Cl. 91—12.6)

This invention relates to coating apparatus and more particularly to an automatic machine for applying a coat of solder to the terminals of electrical apparatus.

It is an object of the present invention to provide a simple apparatus for expeditiously applying a coating to parts of an article.

In accordance with one embodiment of the invention, an apparatus for applying a thin coating of solder to the terminals of a piece of electrical apparatus is provided wherein a plurality of carriers for receiving and holding articles are mounted on an endless conveyor which travels in a predetermined path adjacent a fluxing tank, a solder tank and a washing tank. Means are provided in the machine for causing clamping plates on the carriers to be reciprocated with respect to the endless conveyor for the purpose of dipping the terminals of articles held on the clamping plates into the fluxing tank, the solder tank and the washing tank. There is provided means for removing excess solder from the terminals of the article and returning it to the solder tank and this means includes mechanism for lifting the clamping plate and letting it drop by gravity to jar the excess solder from the terminals. The means for driving the conveyor which supports the carriers in their travel is controlled by a mechanism which, upon actuation, will supply power to the conveyor to move one of the carriers supported by the conveyor successively into association with the fluxing bath and the solder bath. This control mechanism is so arranged that it may be set at practically any time during a cycle of movement of the conveyor to initiate the next succeeding cycle. In other words, the control is so arranged that if the operator of a machine desires to have it operate continuously, he may set the control mechanism either before or after the completion of one fluxing and tinning operation to cause the machine to continue its operation and carry the next succeeding carrier into association with the fluxing and tinning baths by operating the controls at any time after the preceding carrier has started on its cycle. Each carrier has a mechanism on it for skimming the dross from the solder in the tank immediately before the terminals of the apparatus on the carrier are dipped in the solder.

Other objects and advantages of the present invention will become apparent from the following detailed description of the construction thereof when considered in conjunction with the accompanying drawings, wherein Fig. 1 is a side elevational view of a tinning machine for tinning the terminals of telephone cross bar switch vertical units after the units have been assembled;

Fig. 2 is a plan view of the structure shown in elevation in Fig. 1;

Fig. 3 is an enlarged fragmentary front elevational view taken on the line 3—3 of Fig. 2 in the direction of the arrows and showing some of the details of construction of one of the carriers;

Fig. 4 is a fragmentary sectional view taken on the line 4—4 of Fig. 3 in the direction of the arrows;

Fig. 5 is a fragmentary horizontal sectional view taken along the line 5—5 of Fig. 1 in the direction of the arrows showing part of the mechanism for removing excess solder from the terminals;

Fig. 6 is a fragmentary vertical sectional view taken on the line 6—6 of Fig. 1 in the direction of the arrows;

Figure 7:
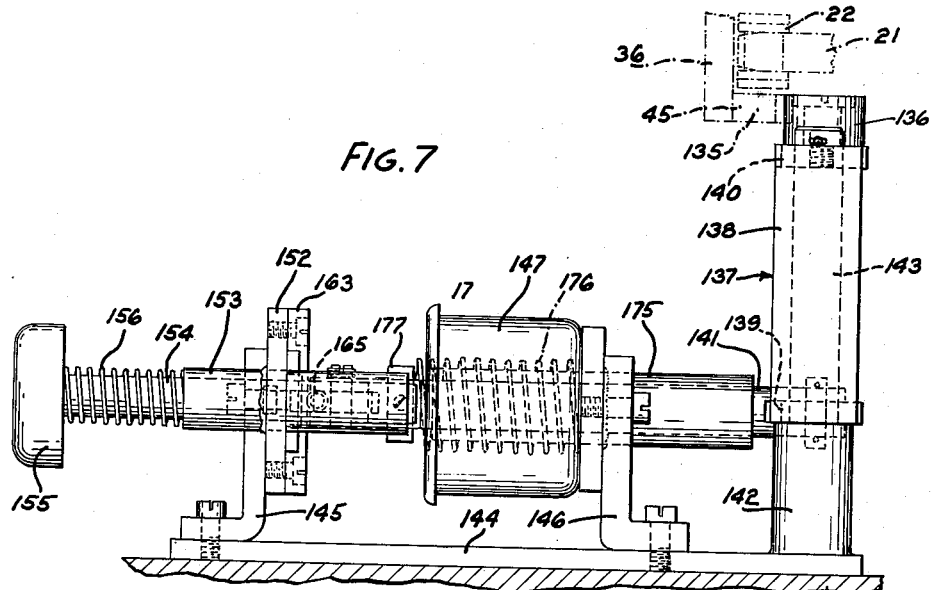
Fig. 7 is an enlarged fragmentary sectional view taken along the line 7—7 of Fig. 1 in the direction of the arrows showing some of the details of construction of the controls.

Referring now to the drawings, wherein like reference characters designate the same parts throughout the several views, particular reference being had to Figs. 1 and 2, the numeral 11 designates, generally, a bench or table upon which the machine covered by the present invention may be positioned. Extending upwardly from the bench 11 are a pair of standards 12 and 13, which support a base plate 14, on which most of the apparatus comprising the machine is mounted. The base plate 14 has fixed thereto a bracket 15 for supporting one end of a motor mounting plate 16 on which there is positioned a driving motor 17 for supplying power to drive the various moving parts of the apparatus. The power is transmitted from the motor 17 through a belt 18 to a speed reducer unit 19, which is mounted upon the plate 14, and transmits power to a shaft 20. The shaft 20 extends downwardly through the base plate 14 and has a sprocket 21 fixed to it for driving a link chain 22. The upper end of the shaft 20 has a reduced portion which extends through the motor mounting plate 16 and the shaft 20 also has fixed to it a sprocket 23 for driving a chain 24. Mounted upon the left end of the base plate 14 is a bearing sleeve 30, in which there is, in turn, mounted a shaft 31 for driving a pair of idler sprockets 32 and 33, which are positioned at the same levels as the sprockets 23 and 21, respectively, and cooperate with the sprockets 23 and 21 to support the chains 24 and 22.

Fixed to the chains 22 and 24, and equally spaced about the length thereof, are a plurality of carriers, designated generally by the numeral 34. In the present embodiment of the invention, there are five of these carriers shown, but it will be understood that any desired number could be provided which might be more or less than those shown, depending upon the proportions of the other parts of the apparatus. The details of construction of one of the carriers 34 are shown on a relatively enlarged scale in Figs. 3, 4, 5 and 6, and particular reference will now be had to those views. Since all of the carriers are identical in construction, only one of them will be described in detail.

The carrier 34 comprises a main supporting plate 36, which extends vertically between the chains 22 and 24 and which has suitably fixed to its upper end a horizontally extending plate 37. A pair of lugs 38 and 39 cooperate with the plate 37 to receive a pair of pins 40 and 41, respectively, which pass through spaced links in the chain 24 thereby to fix the main supporting plate 36 to the chain. The central portion of the upper end of the main supporting plate 36 is cut out, as shown at 42, to permit the links of the chain 24 to move into the plate 36 when the links of the chain are in engagement with either the sprocket 23 or the sprocket 32. At the lower end of the plate 36 a similar construction is provided, which comprises a pair of lugs 43 and 44, a horizontally disposed plate 45 and pins 46 and 47, which serve to fix the lower end of the plate to the chain 22. A cut out 48, similar to the cut out 42, is formed at the bottom of the plate to permit the chain 22 to enter the plate when the clamping assembly is moving around the sprockets 21 and 33.

Fixed to the faces of the plate 36 are a pair of guide members 49 and 50, which serve to guide a slidable clamping plate 51 in its movement with respect to the main supporting plate 36. The clamping plate 51 has fixed to it a rectangular block 52, which is slidable in a slot 53, formed in the main supporting plate and cooperates with the guide members 49 and 50 to guide the clamping plate 51 in its travel vertically with respect to the main supporting plate 36. Mounted on the block 52 is a cam roller 54, which cooperates with cams, to be described hereinafter, for moving the clamping plate 51 vertically with respect to the plate 36. Secured to the face of the clamping plate 51 is a support bracket 60 having a pair of arms 61 and 62 adapted to receive a piece of electrical apparatus, the terminals of which are to be tinned. The bracket 60 has formed at its upper end a shoulder 63 having an angularly disposed face, as shown most clearly in Fig. 4, against which a surface of the article being tinned may rest.

Extending outwardly to the left (Fig. 4) from the face of the clamping plate 51 is a clamp support 64, on which there is pivotally mounted a clamp 65 provided with a handle 66. The lower or clamping end of the clamp 65 has a spring 67 fixed to it and to the clamp support 64 so that when the clamp is in the position shown in Figs. 1 and 4, the spring 67 will cause the lower end of the clamp to engage a piece of electrical apparatus supported by the shoulder 63 and arms 61 and 62 on the clamping plate 51. However, when the handle 66 is moved outwardly, the clamp will rock about its pivot to move the spring 67 past the pivot point of the clamp, whereupon the clamp will be held in its open or inoperative position. It will be noted that the clamp 65 is provided with a portion 69, which extends at right angles to the remainder of the clamp. This portion of the clamp will, when the handle 66 is moved in a clockwise direction (Fig. 4), pass through an aperture 70 in the plate 51 and an aperture 71 in the main supporting plate 36 when the plates are in the position shown in Figs. 3 and 4.

When the portion 69 of the clamp 65 moves into the apertures 70 and 71 to permit an article to be positioned on the supporting bracket 60, the spring 67 will hold the clamp in its inoperative position, and, in the event the operator fails to move the clamp down to clamp an article on the bracket 60, the clamp will be snapped into clamping position when the plate 51 moves downwardly due to the engagement of the portion 69 with the lower edge of the aperture 71 in the plate 36, thereby to insure that an article placed on the bracket will not be jarred from it in the operation of the apparatus.

The main supporting plate 36 carries a skimming mechanism for skimming the dross from the surface of a solder pot 80 and the skimming mechanism is designated, generally, by the numeral 81. The skimming mechanism 81 comprises a skimming blade 82, which is formed integrally with the base of a U-shaped member 83, the arms of which are apertured, as shown at 84—84, to receive a pin 91. The pin 91 pivotally supports the U-shaped member 83 on a bracket 85, suitably fixed to the main supporting plate 36. Fixed to the U-shaped member 83 at the juncture of its base and one of its arms is a trip rod 86, adapted to engage a pin 87 positioned adjacent the leading end of the solder pot 80 during the passage of a carrier 34 into association with the solder pot 80. A leaf spring 88 is fixed at one end to a stud 89 projecting from the plate 36 and bears against a second stud 90 to hold the free end of the spring in engagement with one of the arms of the U-shaped member 83, thereby to hold the U-shaped member either in the position shown in solid lines or the position shown in dot and dash lines in Fig. 3. When the trip rod 86 strikes the pin 87, the skimming blade 82 will be moved to the dot and dash line position and will be held there by the spring 88 during the travel of the carrier 34 past the solder pot and will scape the dross from the surface of the solder in the solder pot while the terminals of the apparatus being coated are being dipped into the solder. As soon as the carrier 34 moves to the point where the skimming blade 82 strikes the edge of the solder pot 80, the U-shaped member 83 will be rocked about the pin 91 to the position shown in full lines in Fig. 3, and it will be held in that position until the trip rod 86 again strikes the pin 87 the next time the carrier 34 moves into position over the solder pot.

The carrier 34 has suitably mounted thereon a pair of rollers 100—100, which travel in channel members 101 and 102 positioned at the front and rear of the apparatus. The channel members 101 and 102 are mounted on brackets 103—103, which are, in turn, mounted upon the base plate 14. These channel members serve to guide the carriers 34 during their travel in the apparatus at the points where the clamping plate 51 is being moved with respect to the main supporting plate 36 and also serve to carry cams 104, 105, 106, 107 and 108 (Figs. 1 and 2). The cam 106, on which the roller 54 bears, as seen in Figs. 3 and 4, serves to carry the clamping plate 51 in a raised position, as shown, until the piece of electrical apparatus carried on the supporting bracket 60 is in vertical alignment with a flux tank 109. As the carrier 34 reaches a position where the article supported by it is directly above the flux tank 109, the roller 54 will travel down the inclined surface at the end of the cam 106 to move the terminals shown in dot and dash lines at 110 of the electrical apparatus into a flux solution in the flux tank 109 and after dipping the terminals 110 in the solution in the tank 109 the roller 54 will engage the inclined surface of the cam 104 to carry the clamping plate 51 upwardly with respect to the main supporting plate 36 and thereby move the terminals 110 out of the flux tank. As the carrier 34 travels across the front of the machine, the roller 54 will next engage the inclined surface at the left end of the cam 104 (Fig. 1) and ride down the surface of the cam to dip the terminals 110 in a bath of molten solder in the pot 80, which may be heated in any suitable manner to maintain the solder in a molten condition. The roller 54 will, in succession, engage the cams 107, 108, 105 and 106 to carry the terminals, as will be described more in detail in connection with the description of the operation of the apparatus, through the flux tank 109, the solder pot 80 and a washing solution contained in a wash tank 111.

Referring now to Figs. 3, 4, 5 and 6, it will be noted that adjacent its lower end the main supporting plate 36 has fixed to it a pair of guide members 112 and 113 in which there is slidably mounted a bumping plate 114, which has a pair of arms 115 and 116 formed on it and extending into slots 117 and 118, respectively, formed in the plate 36. Mounted in the rear end of the bumping plate 114 is a cam roller 119 adapted to cooperate with a cam 120 fastened on the base plate 14. The bumping plate 114 is normally urged to the rear (upwardly in Figs. 2 and 5 and to the right in Fig. 6) by a pair of springs 121 and 122 seated in pockets 123 and 124, respectively, formed in the bumping plate, said springs engaging the rear surface of the main supporting plate 36 and normally urging the plate 114 to engage abutments 125 and 126 formed on the guide members 113 and 112. The bumping plate 114 is provided to take up the shock of the clamping plate 51 after it rides off of the high cams 107 and 108 and drops by gravity to jar excess solder from the terminals 110, the arms 115 and 116 of the bumping plate being normally retracted out of the path of the clamping plate 51, but being moved by the cam 120 to the position shown in Figs. 5 and 6 when the cam roller 119 engages the cam 120.

At the bottom of each of the carriers 34, there is a cam 135 fixed to the main supporting plate 36. This cam 135 is formed integrally with the plate 45 and engages a roller 136 mounted on the free end of a U-shaped lever, designated generally by the numeral 137, and comprising a base 138 extending vertically and two arms 139 and 140 extending horizontally. The upper arm of the lever 137 has a roller 136 mounted upon it and the lower arm 139 of the lever 137 (Fig. 7) is pivotally connected to a push rod 141. The lever 137 is pivotally mounted on a post 142 having a reduced portion 143 which extends through the arms 139 and 140 of the lever and provides a pivot for it.

Figure 8:
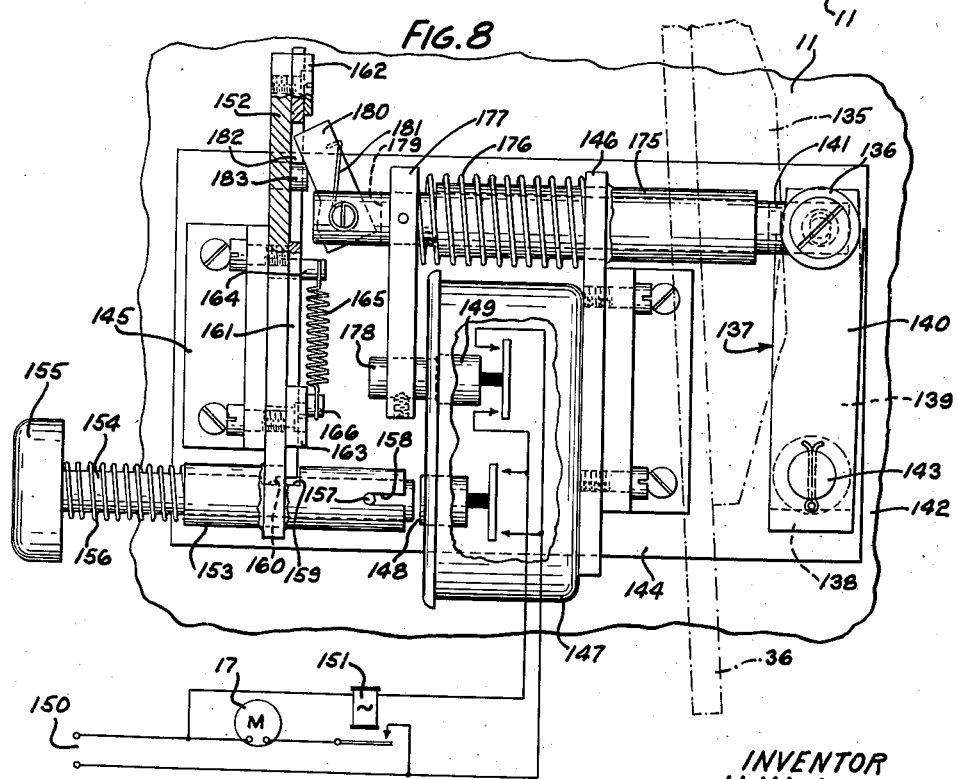
Fig. 8 is a fragmentary view in plan of the mechanism shown in Fig. 7, parts of the mechanism being broken away to more clearly illustrate the mode of operation and details of construction thereof.

Mounted upon the base plate 11 is a mounting plate 144 on which there are fixed a pair of brackets 145 and 146. The bracket 146 has positioned thereon a switch box 147, in which there are mounted a start button 148 and a stop button 149. The start button is of the normally open type and the stop button is of the normally closed type and both are connected in series with a source of current supply 150 to a relay 151 so that if either of the buttons close their circuit, the relay will be operated and will connect the current supply 150 across the motor 17 to cause it to operate. A plate 152 is fixed to the bracket 145 and has mounted at its end (the lower end in Fig. 8) a sleeve 153 in which there is slidable a plunger 154 having a button 155 mounted on the outer end thereof (left end, Fig. 8). The right end of the plunger 154 (Fig. 8) is in direct alignment with the start button 148 and the plunger has a coil spring 156 surrounding it and interposed between the button 155 and the sleeve 153 normally to urge the plunger 154 to the left, a pin 157 seated in the plunger 154 and positioned in a slot 158 formed in the sleeve 153, preventing movement of the plunger to the left (Fig. 8) beyond the position shown. The sleeve 153 is cut away, as shown at 159, to permit a slidable plate 161 to enter the notch 160 in the plunger 154. The slidable plate 161 is mounted upon the plate 152 by means of a pair of guide members 162 and 163, which permit the plate 161 to slide with respect to the plate 152. Fixed to the plate 161 is a pin 164 having a spring 165 attached to it and to a pin 166 mounted in the guide member 163. The spring 165 tends to move the plate 161 into the notch 160 in the plunger 154 and when the plunger 154 is moved to the right (Fig. 8) the plate 161 will snap into the notch 160 to hold the plunger 154 in its right hand position where the start button 148 will close its associated circuit and through the relay 151 supply current to the motor 17.

A sleeve 175 is fixed in the bracket 146 and serves to guide the push rod 141 in its movement. Surrounding a portion of the sleeve 175, and in engagement with the left-hand surface (Fig. 8) of the bracket 146, is a coil spring 176, the other end of which abuts an arm 177 fixed to the push rod 141 and carrying at its free end a stop button actuating plunger 178. Since the contacts controlled by the stop button 149 are normally closed, it will be apparent that each time the push rod 141 is moved to the right (Fig. 8), it will open the circuit to the relay 151 unless the circuit to the relay 151 is closed through the contacts associated with the start buttons 148.

Formed in the left end (Fig. 8) of the push rod 141 is a slot 179 in which there is pivotally mounted a trip latch 180 normally urged to rotate about its pivot in a counter-clockwise direction by a spring 181. The free end of the trip latch 180, when the push rod 141 is in the position shown, enters a slot 182 and rests against a pin 183 which extends through the slot 182 and is mounted on the plate 152. The trip latch serves to move the plate 161 out of the notch 160, as will be described more in detail hereinafter, to permit the plunger 154 to move to the left and into the position shown at a predetermined time in the cycle of operation of the machine.

A better understanding of the invention will be had by reference to the following brief description of the mode of operation of the various details of the apparatus, which have been described hereinbefore. When the apparatus is at rest, the carriers 34 will stop in substantially the positions shown in Figs. 1 and 2, where one of them is just about to dip the terminals 110 into the flux tank 109, two of them are in a position where the terminals 110 of the apparatus being tinned are in the wash tank 111, one of them is in a position where it has just passed through the solder pot 80 and has passed over the two bumping cams 107 and 108, and the fifth one is en route to the wash tank after having passed through the flux tank and solder pot. The carrier 34, shown adjacent to the flux tank 109, is at the loading and unloading position of the apparatus where an operator may remove an article, the terminals of which have been coated with solder, and replace it with an article, the terminals of which are to be coated. In order to position an article on the carrier 34 in position to be coated, the operator raises the handle 66 until the springs 67 move past the pivot point, whereupon the clamp will snap to its fully open position and remain in that position until the clamp 65 is manually or automatically moved to the clamping position as shown most clearly in Fig. 4. After an article has been placed on the carrier 34, and it will be understood that in the herein-disclosed embodiment of the invention the apparatus is particularly adapted to apply a coating of solder to the terminals of a telephone cross bar switch vertical unit, which is a device having a large number of terminals extending from it, the operator may push the button 155 to the right (Fig. 8) to close the circuit through the contacts of the start button 148 and through the relay 151. The relay 151 will then connect the source of current supply 150 through the motor 17 and the motor will drive the chains 22 and 24. Shortly after the motor 17 starts to operate, the carrier 34, which has just been loaded with an article to be coated, will move to the position where the cam roller 54 will ride down the inclined surface of the cam 106 to dip the terminals 110 in the flux solution in the flux tank 109 and continued movement of the chains in a clockwise direction (Fig. 2) will carry this carrier 34 into position where the roller 54 will engage the cam 104 and ride up onto its upper surface, it being understood that the clamping plate 51 will, by gravity, follow the path of the roller 54 along the camming surfaces of the various cams. Continued movement of the chains 22 and 24 in a clockwise direction will then carry the carrier 34 off of cam 104, the clamping plate 51 will again move downwardly to dip the terminals 110 into the molten solder in the solder pot 80, it being understood that just prior to the point where the clamping plate 51 slides downwardly on the end of the cam 104 to dip the terminal in the solder pot 80, the pin 87 will engage the trip rod 86 and will trip the skimming blade 82 to the position shown in dot and dash lines in Fig. 3, where the skimming blade will reach into the bath of solder and remove dross therefrom in the area in which the terminals are to drop into the solder. Continued movement in a clockwise direction of the chains will cause the cam roller 54 to ride up the inclined surface of the cams 107 and 108 in succession and drop by gravity down the vertical surfaces thereof. Just before the cam roller 54 reaches the top of cam 107, cam 120 becomes effective to move the bumping plate 114 to the positions shown in Figs. 5 and 6, where it will have its arms 115 and 116 in the path of clamping plate 51 so that when the cam roller 54 passes off the tip of the cams 107 and 108 and drops the plate 51 downwardly, the bottom edge of the plate 51 will strike the arms 115 and 116 of the bumping plate 114 to jar the excess solder from the terminals. The clamping plate 51 will be held up by the arms 115 and 116 until the cam roller 54 is over the cam 105 and as soon as the cam roller 54 is in vertical alignment with the cam 105, the cam roller 119 will ride on the surface of the cam 120 and permit the springs 121 and 122 to move the bumping plate out of association with the clamping plate 51, thereby to permit the cam roller 54 to drop down onto the cam 105 and carry the plate 51 at that height onto the wash tank 111. As the carrier 34 carries the skimming blade 82 past the end of the solder pot 80, the skimming blade will engage the edge of the solder pot and be snapped back to its inoperative position, as shown in solid lines in Fig. 3. If the chains 22 and 24 continue to move in a clockwise direction around their sprockets 21 and 23 and 32 and 33 the carrier 34, which holds the article, the terminals of which have been tinned, will be carried around and the cam roller 54 will ride down off the upper portion of the cam 105 to dip the terminals in the wash tank 111 where they will be cleaned and cooled and still further movement of the chains will carry the carrier 34 up onto the cam 106 and back to the loading and unloading position adjacent the flux tank 109. It will be understood that each of the carriers 34 is equipped with a cam 135 and that if the button 155 is operated only once each clamping assembly will move through approximately one-fifth of its cycle about the sprockets 21, 23, 32 and 33 due to the fact that the cam 135 on the next succeeding clamping assembly 34 will stop the clamping assemblies in substantially the position shown in Fig. 2. Cam 135 is effective to stop the clamping assemblies in the position shown in Fig. 2 due to its engagement with the cam roller 136, which will cause the U-shaped lever 137 to rock about its pivot on the reduced portion 143 of the post 142. As the cam roller 136 is rocked in a clockwise direction (Fig. 8) by the cam 135, it will, through the U-shaped lever 137, move the push rod 141 to the right (Fig. 8) against the action of the spring 176, thereby to carry the plunger 178 into the position shown, where it will open the circuit at the stop button 149 to disconnect the source of current supply from the motor 17. When the push button 155 was pushed to the right on the initial cycle of operation, it closed the circuit at the start button 148 and the slidable plate 161 was permitted to move under control of the spring 165 into the notch 160, thereby locking the circuit closed past the push button 148. However, as soon as cam roller 136 moves off of the cam 135, thereby permitting the spring 176 to move the push rod 141 to the left (Fig. 8), two things occur. First, the push button 149 closes the circuit to the relay 151 and then further movement of the rod 141 to the left will cause the trip latch 180 to engage the edge of the slot 182 in the slidable plate 161 and cam the plate upwardly (Fig. 8) out of the notch 160, whereby the spring 156 will be permitted to move the plunger 154 to the left and open the circuit at the push button 148. It will thus be apparent that current is supplied to the relay 151 through the normally closed contacts of push button 149 during the period when none of the cams 135 are engaging the cam roller 136 and that as soon as a cam 135 engages the cam roller 136, the circuit will be opened at the push button 149 unless the button 155 had been operated a second time after cam roller 136 was disengaged from the cam 135 on the preceding carrier 34.

Although a specific embodiment of the invention has been described hereinbefore, it will be understood that it is subject to many modifications and adaptations, without departing from applicant's invention, which is to be limited only by the scope of the appended claims.

What is claimed is:

1. In a coating apparatus of the type including an endless conveyor having a series of article carriers mounted thereon, a main supporting plate in each article supporting assembly, a plate slidable with respect to said main supporting plate, and means for controlling movement of the shiftable plate with respect to the main supporting plate including a cam of such configuration as to raise the plate and then permit it to drop by gravity, and a retractable stop movable into the path of the shiftable plate to stop its movement suddenly when it drops by gravity, thereby to jar excess coating material from the article being coated.

2. In a coating apparatus of the type including an endless conveyor having a series of article carriers mounted thereon, a main supporting plate in each carrier, a plate slidable with respect to said main supporting plate, means for raising the slidable plate with respect to the main supporting plate including a cam of such configuration as to raise the plate and then permit it to drop by gravity and a retractable stop movable into the path of the shiftable plate to stop its movement suddenly when it drops by gravity, thereby to jar excess coating material from the article being coated, and a clamp mounted on the slidable plate and having a portion which projects through the slidable plate for engagement with and actuation by a portion of the main supporting plate when the slidable plate moves in one direction with respect to the main supporting plate to render the clamp effective.

3. In a coating apparatus which includes an endless conveyor and a series of article carriers on said conveyor, means for driving said conveyor, control means for controlling the operation of the driving means including a pair of switches connected in parallel, manually operable means for closing one of said switches, and a cam actuated mechanism for releasing said closed switch and closing the other switch in parallel therewith, said cam actuated mechanism being actuated by a cam positioned on each of said carriers.

4. In an article coating apparatus, a plurality of containers, means for dipping articles in said containers including a conveyor, carriers on the conveyor for supporting the articles, a motor for driving the conveyor, and means for controlling the motor including a manually operable start switch, a mechanically operable stop switch, means on each carrier for operating the stop switch, and means for temporarily rendering the stop switch inoperative to stop the motor.

5. In an article coating apparatus, a plurality of containers, means for dipping articles in said containers including a conveyor, carriers on the conveyor for supporting the articles, a motor for driving the conveyor, and means for controlling the motor including a manually operable start switch, means for holding said switch closed, a normally closed stop switch, means connected to said stop switch for releasing the holding means, and means on each carrier for actuating the stop switch to open it.

6. In a coating apparatus for applying a coating to the terminals of electrical units, a conveyor, means for supporting electrical units on the conveyor, means for raising and lowering the units with respect to the conveyor to dip the terminals of the units into a coating solution, and means movable into the path of part of the raising and lowering means to interrupt the movement of the units abruptly to shake excess coating material from the terminals.

7. In an apparatus for applying a coating of solder to the terminals of electrical units, a conveyor, a plurality of unit carriers on the conveyor, means for moving the units with respect to the conveyor, a bath of molten solder associated with said raising and lowering device, and a skimming mechanism mounted on each carrier for skimming the surface of the solder of the bath before the terminals are dipped in the bath.

8. In an apparatus for applying a coating of solder to the terminals of electrical units, a conveyor, a plurality of unit carriers on the conveyor, means for moving the units with respect to the conveyor, a bath of molten solder associated with said raising and lowering device, a skimming mechanism mounted on each carrier for skimming the surface of the solder of the bath before the terminals are dipped in the bath, said skimming mechanism comprising a normally retracted skimming blade, means for moving the skimming blade out of its retracted position, and means for returning the skimming blade to its retracted position after it has skimmed the surface of the solder.

9. In a coating apparatus of the type including an endless conveyor having a series of article carriers thereon, a fluxing tank, a solder tank, a cleaning tank, means associated with the conveyor for dipping parts of articles into the tanks, a skimming mechanism mounted on each carrier, means associated with the solder tank for moving said skimming mechanism to operative position, and means for normally holding the skimming mechanism in its inoperative position.

10. In a coating apparatus of the type including an endless conveyor having a series of article carriers thereon, a fluxing tank, a solder tank, a cleaning tank, means associated with the conveyor for dipping parts of articles into the tanks, a skimming mechanism mounted on each carrier, means associated with the solder tank for moving said skimming mechanism to operative position, means for normally holding the skimming mechanism in its inoperative position, said skimming mechanism comprising a normally retracted blade, means for supporting said blade, and means for normally holding the blade in retracted position.

11. In an article coating apparatus, a plurality of containers, means for dipping articles in said containers including a conveyor, carriers on the conveyor for supporting the articles, a motor for driving the conveyor, and means for controlling the motor including a manually operable start switch, a mechanically operable stop switch, means on each carrier for operating the stop switch, and means under control of the start switch for temporarily rendering the stop switch inoperative to stop the motor.

12. In an article coating apparatus, a plurality of containers, means for dipping articles in said containers, including a conveyor, carriers on the conveyor for supporting the articles, a motor for driving the conveyor, and means for controlling the motor including a manually operable start switch, means for holding said switch closed, a normally closed stop switch, trip mechanism operable by the stop switch for releasing the holding means, and means on each carrier for actuating the stop switch to open it.

13. In an article coating apparatus, a plurality of containers, means for dipping articles in said containers including a conveyor, carriers on the conveyor for supporting the articles, a motor for driving the conveyor, and means for controlling the motor including a manually operable start switch, means for holding said switch closed, a normally closed stop switch, trip mechanism operable by the stop switch for releasing the holding means, means on each carrier for actuating the stop switch to open it, and means operable by the start switch for rendering the trip mechanism temporarily ineffective to release the holding means.

HOWARD W. GARBE.